UNITED STATES PATENT OFFICE.

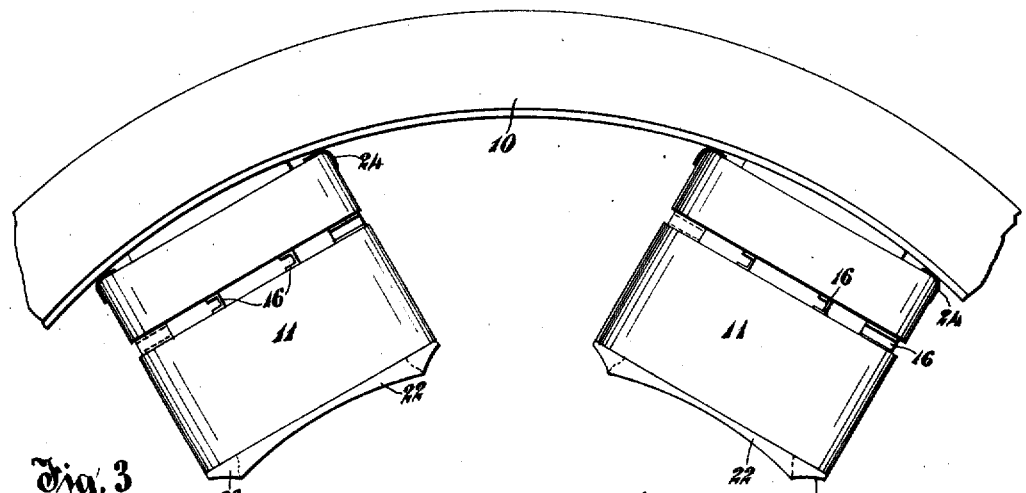
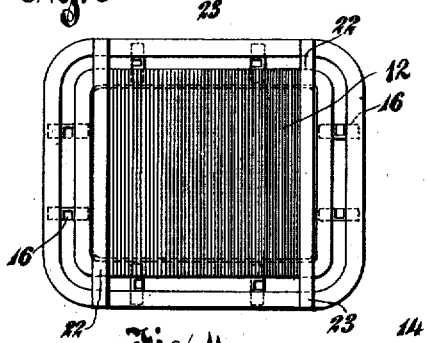
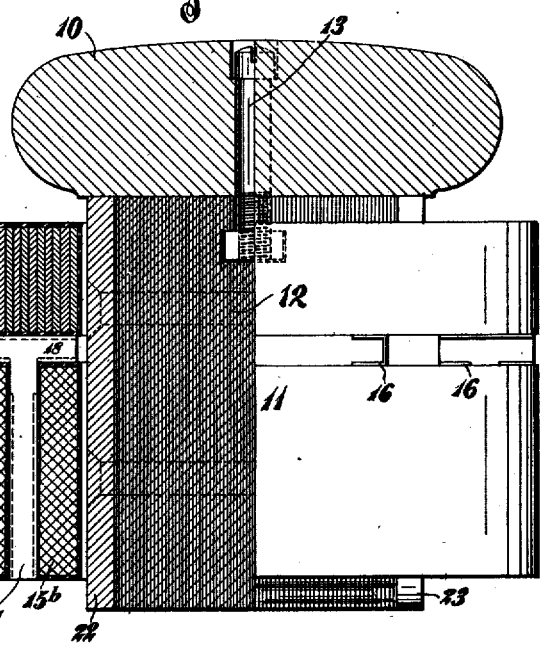
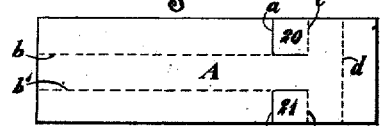
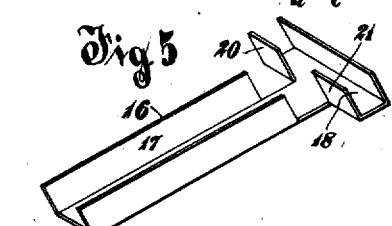

WALTER J. RICHARDS, OF NORWOOD, OHIO, ASSIGNOR TO ALLIS-CHALMERS COMPANY, A CORPORATION OF NEW JERSEY.

DYNAMO-ELECTRIC MACHINE.

933,267.　　　　Specification of Letters Patent.　　Patented Sept. 7, 1909.

Application filed January 31, 1907. Serial No. 354,960.

*To all whom it may concern:*

Be it known that I, WALTER J. RICHARDS, citizen of the United States, residing at Norwood, in the county of Hamilton and State of Ohio, have invented certain new and useful Improvements in Dynamo-Electric Machines, of which the following is a full, clear, and exact specification.

My invention relates to dynamo-electric machines and particularly to the field magnets thereof.

The object of my invention is to provide a field magnet which will be well ventilated, very simple in construction, and inexpensive to manufacture.

With these ends in view, I divide the coils in sections and arrange, support and space them apart in such a manner and with few parts so constructed that a large amount of air can circulate around and between the coils as will be described more fully in this specification.

My invention further consists in certain novel details of construction and combinations and arrangements of parts described in the specification and set forth in the appended claims.

In the drawings, Figure 1 is a partial side elevation of a field yoke provided with compound wound field magnets equipped with my invention; Fig. 2 is a sectional elevation of the same showing one of the field magnets partly in section; Fig. 3 is an end view of one of my improved field magnets; Fig. 4 is a sheet metal punching from which one of the coil separators are made; and Fig. 5 is an isometric view of one of the separators.

Referring now to the figures of the drawings, 10 represents a portion of the field yoke to which the field magnets 11 are secured. The field poles 12 in this case are laminated and are secured to the yoke by bolts, one of which is shown at 13. Each field magnet in this instance is compound wound having series and shunt coils 14 and 15, the arrangement and manner of supporting and spacing of which will now be described. In order that the coils may not become overheated, I divide the shunt coils into two sections 15ᵃ and 15ᵇ and arrange them concentrically at the armature end of the pole and space them apart so that air can pass freely outward between the shunt coils onto the series coil, the series and shunt coils likewise being spaced apart as will be described. The spacing or separating devices for the coils consist, in this case, of T-shaped members 16, the longer arms 17 of which extend between the concentric shunt coils so as to space them apart, and the shorter cross arms 18 of which at right angles to the longer arms 17 extend between the series and shunt coils so as to space them apart. The spacing devices are of such a shape that they interfere with the flow of air as little as possible, and are preferably of the form shown in Fig. 5, the two arms 17 and 18 having their sides extending upward so as to be U or channel shaped. The spacing devices in this case are each formed from a rectangular piece of sheet metal A, as shown in Fig. 4. When the rectangular piece is cut by a die from the sheet metal stock, it is also cut along the full lines *a* and *a'* forming tabs 20 and 21. To obtain the desired shape for the spacing member the sides of the rectangular piece are bent upward at right angles to the central portion along the lines *b* and *b'* forming the U or channel shaped arm 17, and the tabs 20 and 21 are bent upward along the lines *c* and *c'* and the end is bent upward along the line *d* forming the U or channel shaped arm 18 at right angles to the arm 17. The stamping, cutting and bending are preferably done by one operation, although if desired the bending may be done by a second operation. It is seen that a large number of these spacing devices can be easily, cheaply, and quickly made and without any loss or waste of material. If desired the spacing members may be of cast metal.

The spacing devices are each preferably arranged with the parallel sides of the arms bearing on the sides of the coils. With this arrangement of the spacing devices, the edges of the latter can not cut the insulation of the coils. As many of the spacing devices as necessary may be employed in each magnet. In this case, I have shown eight. The coils are retained on the pole pieces in this case by the end heads or plates 22, the corners 23 of which extend beyond the edge of the laminæ and serve as coil seats. This is shown most clearly in Figs. 1 and 3. Thus it is seen that between the corners of the end plates there is nothing to block the ventilating passage-ways. The series coils preferably bear against the field yoke, though separated therefrom by mica or other insulation 24.

It is apparent that with this construction a large volume of air will circulate around and between the coils and dissipate the heat generated therein, since the ventilating passageways are practically unobstructed at all parts of the magnets. Furthermore, the shunt coils being arranged adjacent the armature the best cooling effects are obtained since more heat is generated in the shunt coils than in the series coils under normal conditions of operation. The spacing devices for the coils are light in weight and inexpensive to manufacture. In fact the entire field magnet structure is extremely simple, consisting of very few parts all of which can be easily and cheaply made and easily assembled.

I do not desire to be confined to the exact details shown particularly as to the form and arrangements of parts. For example the number of sections in which the shunt coils are divided can be changed. Also the series coils can be divided into sections as are the shunt coils. I therefore aim to cover all modifications which do not involve a departure from the spirit and scope of my invention.

What I claim as new and desire to secure by Letters Patent is:—

1. In a field magnet, a pole piece having a pair of concentric shunt coils adjacent the armature end of the pole, and a superposed series coil and means for separating all said coils from one another comprising T-shaped spacing members U or channel shaped in cross section.

2. In a field magnet, a pole piece having a pair of concentric coils and a single superposed coil, and means for holding all said coils a predetermined distance apart comprising spacing members punched from sheet metal and each member comprising a U or channel-shaped portion between the concentric coils and a U or channel-shaped portion at right angles thereto and between the two concentric coils and the third coil.

3. As an article of manufacture, a ventilating spacing member for the coils of a field magnet comprising a T-shaped sheet metal punching, the two portions of the spacing member at right angles to each other having their sides bent upward so as to be U or channel-shaped.

4. In a field magnet, a pole piece having a pair of concentric coils, and a third coil beside the first two coils, and T-shaped spacing members for spacing each of said coils from each of the other coils, both the stem and the cross-arm of each of said T-shaped members being U-shaped in cross-section.

In testimony whereof I affix my signature, in the presence of two witnesses.

WALTER J. RICHARDS.

Witnesses:
ARTHUR F. KWIS,
FRED J. KINSEY.